United States Patent
Jung et al.

(10) Patent No.: US 7,328,759 B2
(45) Date of Patent: Feb. 12, 2008

(54) MOBILE ROBOT WITH 360 DEGREES ENDLESS ROTATION TYPE DECOUPLED TURRET

(75) Inventors: Ui Jung Jung, Daejeon (KR); Goon Ho Choi, Daejeon (KR); Byung Soo Kim, Daejeon (KR)

(73) Assignee: Hanool Robotics Corp, Daejeon (KR)

( * ) Notice: Subject to any disclaimer, the term of this patent is extended or adjusted under 35 U.S.C. 154(b) by 322 days.

(21) Appl. No.: 10/547,472

(22) PCT Filed: Mar. 23, 2004

(86) PCT No.: PCT/KR2004/000635

§ 371 (c)(1),
(2), (4) Date: Aug. 30, 2005

(87) PCT Pub. No.: WO2004/085879

PCT Pub. Date: Oct. 7, 2004

(65) Prior Publication Data

US 2006/0175099 A1     Aug. 10, 2006

(30) Foreign Application Priority Data

Mar. 24, 2003   (KR) .................... 10-2003-0018309

(51) Int. Cl.
*B62D 11/00*      (2006.01)
*F16H 48/00*      (2006.01)

(52) U.S. Cl. ...................................... 180/6.48; 180/6.5
(58) Field of Classification Search ............... 180/6.48, 180/6.5
See application file for complete search history.

(56) References Cited

FOREIGN PATENT DOCUMENTS

JP     57-189795      12/1982
JP     2001-199356    7/2001

*Primary Examiner*—Lesley D. Morris
*Assistant Examiner*—Marc A. Scharich
(74) *Attorney, Agent, or Firm*—Arent Fox LLP

(57) ABSTRACT

The object of this invention is to provide a mobile robot base with a decoupled turret mechanism, including a turret (80), a turret motor (1) provided on the turret (80), an actuating motor unit provided on the turret (80) to actuate a plurality of wheels (90), an actuating gear train unit to transmit an actuating force generated from train (10) coupled between the turret (80) and the turret motor (1), and a differential gear train unit coupled to both the turret gear train and the actuating motor unit, so that the differential gear train unit subtracts the rotation of the turret (80) from the rotation of the actuating motor unit, thus transmitting a subtracted rotation to the plurality of wheels (90), and thus, only the rotation of the actuating motor unit is transmitted to the plurality of wheels (90). the actuating motor unit to the wheels (90).

7 Claims, 4 Drawing Sheets

MOBILE ROBOT WITH 360 DEGREES ENDLESS ROTATION TYPE DECOUPLED TURRET

CROSS-REFERENCE TO RELATED APPLICATION

This application is a National Stage entry of International Application No. PCT/KR2004/000635, filed Mar. 23, 2004, the entire specification claims and drawings of which are incorporated herewith by reference.

TECHNICAL FIELD

The present invention relates, in general, to mobile robot bases with decoupled turret mechanisms and, more particularly, to a mobile robot base with a decoupled turret mechanism, in which only a rotation of an actuating motor unit, which is provided on a turret and comprises a plurality of motors, is transmitted to a plurality of wheels regardless of a rotation of the turret.

BACKGROUND ART

Generally, robots have been used in various places of works of persons that are not safe, impossible or inefficient. In addition, conventional robots have been used in repetitive works, or works that require high-level accuracy to increase productivity and quality of products. The conventional robots have been developed for a variety of fields, such as for research, home use and crime prevention as well as various industrial fields. Therefore, recently, it is required that each of actuating units of the robots is operated within a wider range.

Mobile robots are representative examples of the conventional robots. In the conventional mobile robots, a plurality of devices, which really execute desired works, are provided on a turret which is placed on a support frame. By a rotation of the turret on the support frame, directions of the plurality of devices for works are determined.

For example, a mobile robot with a turret is disclosed in Korean Patent Registration NO. 322316 which was filed by the inventor of the present invention and has been registered. As shown in FIG. 4, in the conventional mobile robot disclosed in Korean Patent Registration NO. 322316, a plurality of wheels 206 are provided under a support frame of the robot to move the mobile robot. The plurality of wheels 206 are connected by first and second belts 201 and 202 to each other. The first belt 201 is wound around both a drive motor 204 and the wheels 206, so that the drive motor 204 rotates the wheels 206 through the first belt 201 to move the mobile robot. Both wheel cases which hold the wheels 206 and a turret shaft 205 are rotated by a steering motor 203 through the second belt 202 to determine a direction of the movement of the mobile robot. At this time, a direction of the turret is equal to the direction of the movement of the mobile robot.

However, in the conventional mobile robot disclosed in NO. 322316, to change the direction of the movement of the turret, the robot must be rotated while the second belt 202 is rotated by the operation of the steering motor 203. The above-mentioned movement of the robot requires excessive power consumption and limits the workspace of the robot.

Furthermore, when the turret is rotated at angles higher than a predetermined reference angle, the first and second belts, which connect the plurality of wheels to each other, and a plurality of wires, coupled between the support frame and the turret, may be undesirably entangled to each other. Thus, the conventional mobile robot disclosed in NO. 322316 is problematic in that the turret must be rotated within a limited angular range.

In an effort to prevent the plurality of wires of the conventional mobile robot from being undesirably entangled to each other while the turret is rotated, robot bases using slip rings were proposed in Korean Patent registration NO. 299622 and U.S. Pat. No. 4,657,104. The slip rings communicate powers and sensor signals between turrets and support frames, so that the robot bases have structures possible to endlessly rotate the turrets. However, the slip ring used in each of the conventional robot bases proposed in NO. 299622 and U.S. Pat. No. 4,657,104 causes undesired electric noise. Furthermore, it is very difficult to send high currents through the slip rings of the conventional robot bases. In addition, in case of using the slip rings for long periods, the slip rings must be worn. Because the slip rings are expensive, the conventional robot bases using the slip rings are problematic in that the production costs of the robot bases are increased.

In the meantime, a robot base having a structure possible to endlessly rotate a turret without any entanglement of wires is proposed in Korean Patent Application NO. 2002-0025612 which was filed by the inventor of the present invention. As shown in FIG. 5, the robot base disclosed in NO. 2002-0025612 includes a turret 308 and an electric part. The electric part is provided above the turret 308 and has a turret motor 301, a drive motor 303 and a steering motor 302. The robot base further includes a turret gear train 304 through which the turret 308 is rotated by an operation of the turret motor 301, and a drive gear train 306 through which wheels 307, provided under a support frame 309, are driven by an operation of the drive motor 303. The robot base further includes a steering gear train 305 to determine a direction of a movement of the robot base during an operation of the steering motor 302.

The turret gear train 304, the drive gear train 306 and the steering gear train 305 are arranged to form a triple shaft mechanism in that a drive shaft 311 of the drive gear train 306 is provided around a steering shaft 310 of the steering gear train 305. A turret rotating shaft 312 of the turret gear train 304 is provided around the drive shaft 311. The turret gear train 304 transmits a rotational force generated from the turret motor 301 to the turret 308. The drive gear train 306 and the steering gear train 305 transmit rotational forces generated from the drive motor 303 and the steering motor 302 to the wheels 307, respectively. As described above, the conventional robot base disclosed in NO. 2002-0025612 comprising the electric part at an upper portion of the turret 308 and a mechanical part at a lower portion of the turret 308 has a structure possible to endlessly rotate the turret 308 through the triple shaft mechanism.

However, in the conventional robot base disclosed in NO. 2002-0025612, the drive motor 303 and the steering motor 302 are rotated along with the turret 308 while the turret 308 is rotated by the operation of the turret motor 301. At this time, the drive motor 303 and the steering motor 302 are connected to the wheels 307 through the drive gear train 306 and the steering gear train 305, respectively. To prevent the above-mentioned changes in the locations of the drive motor 303 and the steering motor 302 from undesirably causing movements of the wheels 307, the drive motor 303 and the steering motor 302 must be appropriately operated in response to the rotation of the turret 308. Therefore, the conventional robot base disclosed in NO. 2002-0025612 is problematic in that its control algorithm is very complicated, and power consumption is undesirably increased.

DISCLOSURE OF THE INVENTION

Accordingly, the present invention has been made keeping in mind the above problems occurring in the prior art, and an object of the present invention is to provide a mobile robot base with a decoupled turret mechanism, which has a structure possible to transmit a rotational force generated from a drive motor unit, provided on a turret with 360° endless rotation capability, to a plurality of wheels regardless of the rotation of the turret, so that the drive motor unit is precisely controlled to increase work efficiency of a robot, and reduce power consumption of the robot base.

In order to accomplish the above object, the present invention provides a mobile robot base with a decoupled turret mechanism, including a turret rotatably placed on a support frame, a turret motor provided on the turret, an actuating motor unit provided on the turret to actuate a plurality of wheels, an actuating gear train unit coupled between the actuating motor unit and the plurality of wheels to transmit an actuating force generated from the actuating motor unit to a lower portion of the turret through a triple shaft mechanism, a turret gear train coupled between the turret and the turret motor, and comprising a first turret gear and a turret center gear, so that the turret motor rotates the turret on the support frame through the turret gear train, and a differential gear train unit coupled to both the turret gear train and the actuating motor unit to receive rotations of both the turret and the actuating motor unit, so that the differential gear train unit subtracts a rotation of the turret from a rotation of the actuating motor unit, thus transmitting a subtracted rotation to the plurality of wheels, and thus, only the rotation of the actuating motor unit is transmitted to the plurality of wheels.

The differential gear train unit may include an input gear to engage with the turret center gear of the turret gear train; a differential gear box, having a first gear coupled to the actuating motor unit, a second gear coupled to the input gear, and a third gear interposed between the first and second gears; and an output gear provided at an outside of the differential gear box to be coupled to the actuating gear train unit.

A gear ratio between the output gear of the differential gear train unit and a predetermined gear of the actuating gear train unit, which engages with the output gear, may be ½ times a gear ratio between the turret center gear and the input gear of the different gear train unit.

The mobile robot base may further include an encoder unit provided on an output shaft of the actuating motor unit to detect attitudes of the plurality of wheels regardless of the rotation of the turret.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Figure 1:
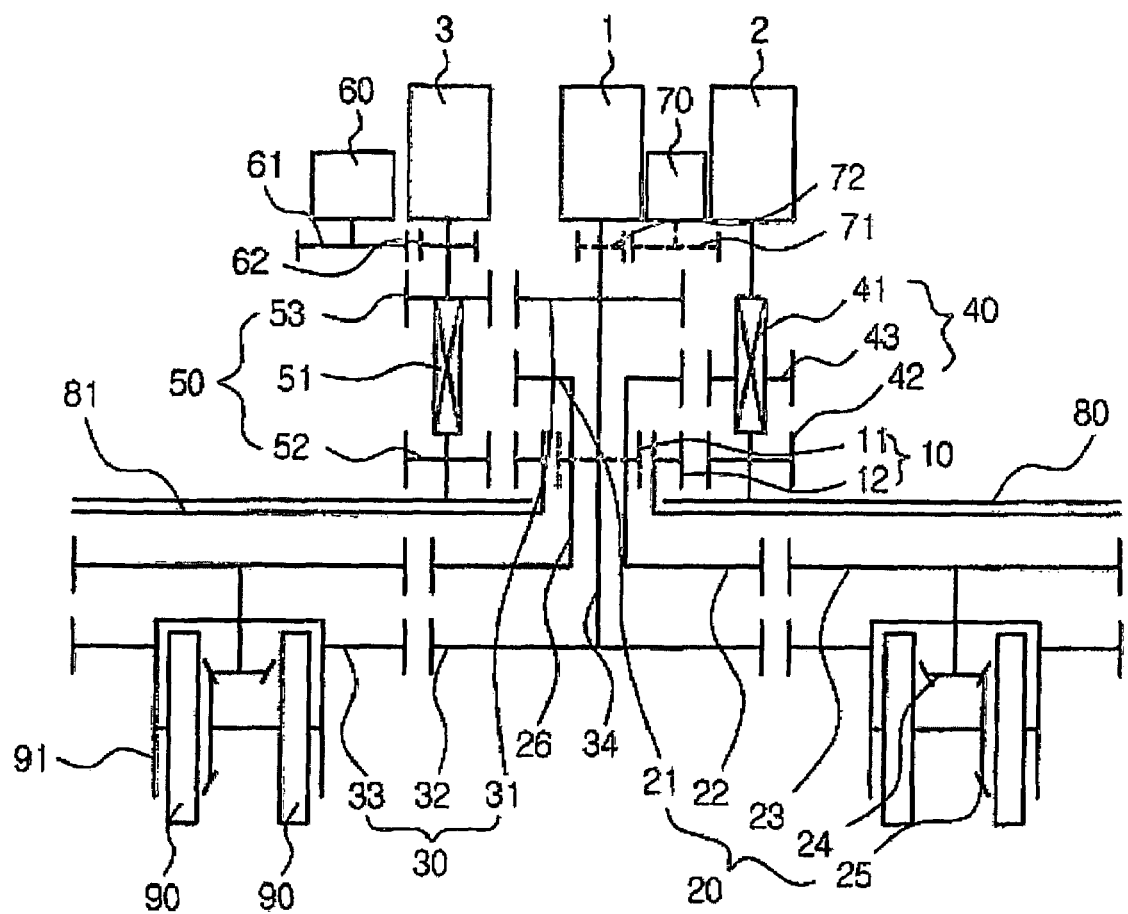
FIG. 1 is a view of a synchronous mobile robot base with a decoupled turret mechanism, according to a first embodiment of the present invention.

Reference should now be made to the drawings, in which the same reference numerals are used throughout the different drawings to designate the same or similar components.

Figure 2:
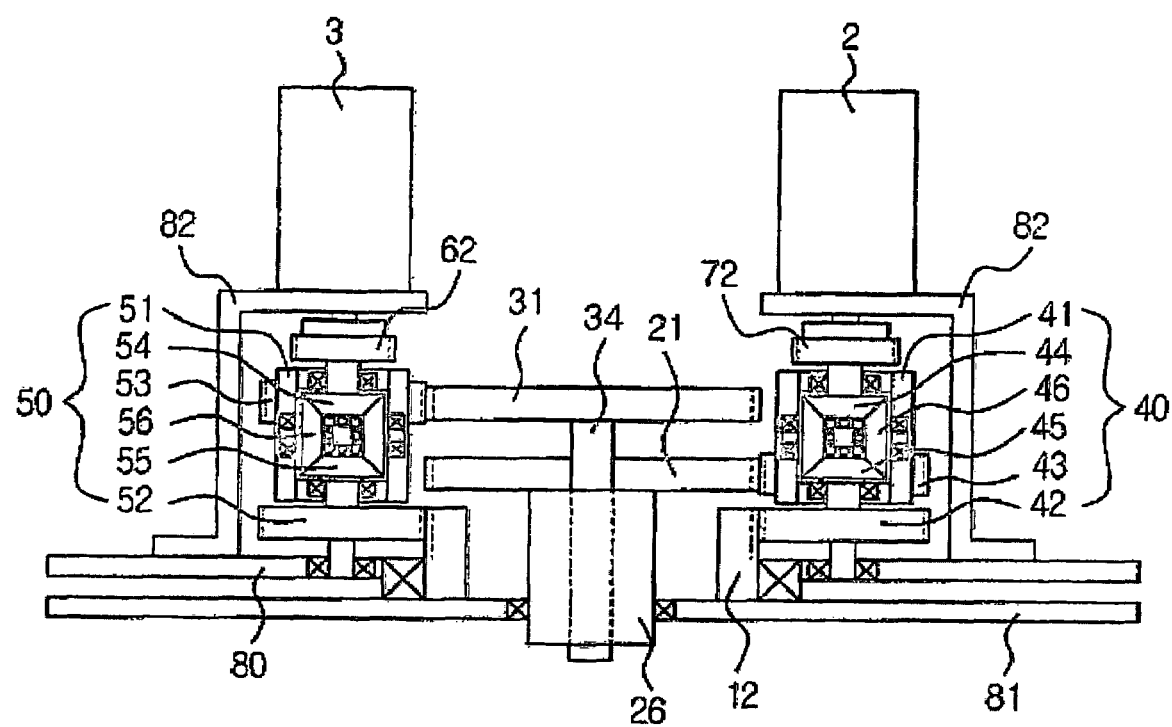
FIG. 2 is a sectional view showing a construction of the synchronous mobile robot base of FIG. 1.

FIG. 1 is a view of a synchronous mobile robot base with a decoupled turret mechanism, according to a first embodiment of the present invention. FIG. 2 is a sectional view showing a construction of the synchronous mobile robot base of FIG. 1. As shown in FIGS. 1 and 2, the synchronous mobile robot base according to the first embodiment of the present invention is a system in which a plurality of wheels 90 are simultaneously moved in the same direction and to the same distance. The mobile robot base according to the first embodiment includes a turret 80 which is rotatably placed on a support frame 81. The mobile robot base further includes a turret motor 1 and an actuating motor unit which are respectively supported on a plurality of support brackets 82 on the turret 80. The actuating motor unit comprises a drive motor 2 and a steering motor 3. The mobile robot base further includes an actuating gear train unit which will be described later herein, and a plurality of wheels 90 which is provided under the support frame 81 to move the mobile robot base. The actuating gear train unit comprises a drive gear train 20 to connect the plurality of wheels 90 to the drive motor 2, and a steering gear train 30 to connect a plurality of wheel cases 91 to the steering motor 3.

The mobile robot base further includes a turret gear train 10 which is coupled between the turret 80 and the turret motor 1 to transmit a rotational force generated from the turret motor 1 to the turret 80. The turret gear train 10 has a first turret gear 11 which is coupled to the turret motor 1, and a turret center gear 12 which is fastened on the support frame 81 to engage with the first turret gear 11.

The mobile robot base further includes a first differential gear train 40 which is coupled to both the turret center gear 12 and the drive motor 2. The drive motor 2, supported on one of the plurality of support brackets 82 on the turret 80, rotates the plurality of wheels 90 through the first differential gear train 40 and the drive gear train 20. The first differential gear train 40 includes a first input gear 42 which engages with the turret center gear 12, and a first differential gear box 41. The first differential gear box 41 comprises a first gear 44 which is coupled to the drive motor 2, a second gear 45 which is coupled to the first input gear 42, and a third gear 46 which is interposed between the first and second gears 44 and 45. The first differential gear train 40 further includes a first output gear 43 which is provided at an outside of the first differential gear box 41 to be coupled to the drive gear train 20.

The drive gear train 20 connects the plurality of wheels 90 to the first differential gear train 40. The drive gear train 20 includes a first drive gear 21 which is provided on an upper end of a drive shaft 26 to engage with the first output gear 43 of the first differential gear train 40, and a second drive gear 22 which is provided on a lower end of the drive shaft 26 so that the second drive gear 22 is connected to the first drive gear 21 through the drive shaft 26. The drive gear train 20 further includes a third drive gear 23 which is associated with each of the plurality of wheel cases 91 and engages with the second drive gear 22. The drive gear train 20 further includes a first bevel gear 24 which is provided in each of the plurality of wheel cases 91 and is rotatably coupled to each of the plurality of third drive gears 23, and a second bevel gear 25 which engages with the first bevel gear 24 to rotate the wheel 90.

The mobile robot base further includes a second differential gear train 50 which is coupled to both the turret center gear 12 and the steering motor 3. The steering motor 3, supported on another one of the plurality of support brackets 82 on the turret 80, controls the plurality of wheel cases 91 through both the second differential gear train 50 and the steering gear train 30, so that a direction of a movement of the robot base is determined by an operation of the steering motor 3. The second differential gear train 50 includes a second input gear 52 which engages with the turret center gear 12, and a second differential gear box 51. The second differential gear box 51 comprises a first gear 54 which is coupled to the steering motor 3, a second gear 55 which is coupled to the second input gear 52, and a third gear 56 which is interposed between the first and second gears 54 and 55. The second differential gear train 50 further includes a second output gear 53 which is provided at an outside of the second differential gear box 51 to be coupled to the steering gear train 30.

The steering gear train 30 connects the plurality of wheel cases 91 to the second differential gear train 50. The steering gear train 30 includes a first steering gear 31 which is provided on an upper end of a steering shaft 34 to engage with the second output gear 53 of the second differential gear train 50, and a second steering gear 32 which is provided on a lower end of the steering shaft 34 so that the second steering gear 32 is connected to the first steering gear 31 through the steering shaft 34. The steering gear train 30 further includes a third steering gear 33 which is provided on each of the plurality of wheel cases 91 to engage with the second steering gear 32, so that each of the wheel cases 91 is rotated along with the third steering gear 33 during a rotation of the second steering gear 32.

In the meantime, the drive shaft 26 passes through a the turret center gear 12 along a rotating axis of the turret center gear 12, so that the drive shaft 26 is coupled at an upper end thereof to the first drive gear 21, which is placed above the turret 80, and at a lower end thereof to the second drive gear 22, placed under the turret 80. The steering shaft 34 is arranged in the drive shaft 26 along a rotating axis of the drive shaft 26. Thus, the steering shaft 34 connects the first steering gear 31, placed above the turret 80, to the second steering gear 32 which is placed under the turret 80.

The output rotating speed of the first or second differential gear train 40 or 50 relative to the rotating speed of the drive motor 2 or the steering motor 3 and the rotating speed of the turret 80 has the following relation.

$$W_{Output} = (W_{Motor} - W_{Turret})/2$$

In the above-mentioned equation, the output rotating speed of the first or second differential gear train 40 or 50 is ½ times a subtracted rotating speed that is resulted from a subtraction of the rotating speed of the turret 80 from the rotating speed of the drive motor 2 or the steering motor 3. At this time, to prevent the rotation of the turret 80 from being transmitted to the plurality of wheels 90, the first or second output gear 43 or 53 of the first or second differential gear train 40 or 50 must be rotated at the same time as the rotation of the turret 80. To achieve the above-mentioned purpose, a gear ratio between the first output gear 43 of the first differential gear train 40 and the first drive gear 21 of the drive gear train 20 is ½ times a gear ratio between the turret center gear 12 and the first input gear 42 of the first different gear train 40.

In the same manner, a gear ratio between the second output gear 53 of the second differential gear train 50 and the first steering gear 31 of the steering gear train 30 is ½ times a gear ratio between the turret center gear 12 and the second input gear 52 of the second different gear train 50.

In the meantime, to obtain precise information of attitudes of the wheel cases 91, the mobile robot base of the present invention further includes a steering absolute encoder 60 which is coupled to an output shaft of the steering motor 3. The steering absolute encoder 60 independently detects the attitude of the wheel cases 91 regardless of the rotation of the turret 80.

To achieve the above-mentioned operational function of the steering absolute encoder 60, the steering absolute encoder 60 has a first detection gear 62 which is provided on the output shaft of the steering motor 3, and a first reduction gear 61 which is provided on the steering absolute encoder 60 to engage with the first detection gear 62. Therefore, the steering absolute encoder 60 obtains the information of a rotation transmitted from the steering motor 3 to the wheel cases 91, regardless of the rotation of the turret 80. At this time, a gear ratio of the steering gear train 30 is set such that a rotation angle of the first reduction gear 61 of the steering absolute encoder 60 is equal to a rotation angle of each of the wheel cases 91, thus preventing operational errors and cumulative errors of the steering absolute encoder 60 from being undesirably caused.

For example, the gear ratio of the steering gear train 30 will be explained herein below on the supposition that the first reduction gear 61 (Z=54, the reference character Z denotes the number of teeth) has 54 teeth and the first detection gear 62 (Z=27) has 27 teeth. When the steering motor 3 rotates one turn, the first reduction gear 61 rotates ½ turn. While the steering motor 3 rotates one turn, the second output gear 53 (Z=51) also rotates ½ turn through the second differential gear box 51. Thereafter, the first steering gear 31 (Z=51) which engages with the second output gear 53 rotates ½ turn. The second steering gear 32 (Z=128), which is coaxially connected to the first steering gear 31 through the steering shaft 34, also rotates ½ turn in the same manner as the first steering gear 31. Because the number of teeth of the third steering gear 33 (Z=128) which engages with the second steering gear 32 is equal to that of the second steering gear 32 (Z=128), the third steering gear 33 rotates ½ turn in the same manner as the first reduction gear 61. As described above, the reduction ratio of the steering gear train 30 is appropriately set according to the gear ratio between the first reduction gear 61 and the first detection gear 62, so that the rotation angle of the first reduction gear 61 can be equal to the rotation angle of each of the wheel cases 91.

In the same manner as that described for the steering absolute encoder 61, to obtain precise information of attitudes of the turret 80, the mobile robot base of the present invention further includes a turret absolute encoder 70. The turret absolute encoder 70 includes a second detection gear 72 which is provided on an output shaft of the turret motor 1 to detect attitudes of the turret, and a second reduction gear 71 which is provided on the turret absolute encoder 70 to engage with the second detection gear 72. Thus, the turret absolute encoder 70 detects only the rotation of the turret 80. A gear ratio between the second detection gear 72 and the second reduction gear 71 is equal to a gear ratio between the first turret gear 11 and the turret center gear 12, so that a rotation angle of the turret 80 is equal to that of the second reduction gear 71 of the turret absolute encoder 70.

The operation and effect of the mobile robot base according to the first embodiment of the present invention will be described herein below.

When the operation of the turret motor 1 starts, the first turret gear 11, coupled to the turret motor 1, is rotated while engaging with the turret center gear 12 fastened on the support frame 81. Thus, the turret 80 is rotated by the operation of the turret motor 1. At this time, the turret absolute encoder 70 detects the attitude of the turret 80 through both the second reduction gear 71 and the second detection gear 72.

When the turret 80 is rotated by the turret motor 1, both the drive motor 2 and the steering motor 3, which are provided on the turret 80, are rotated along with the turret 80 around a rotating axis of the turret 80. In above state, in case that both the drive motor 2 and the steering motor 3 are not operated, both the first input gear 42 of the first differential gear train 40 and the second input gear 52 of the second differential gear train 40, which engage with the turret center gear 12, are rotated around the turret center gear 12. By the rotations of the first and second input gears 42 and 52, the second gear 45 of first differential gear box 41 and the second gear 55 of the second differential gear box 51 are rotated, respectively. While the two second gears 45 and 55 are rotated, the third gear 46, which is interposed between the first gear 44 and the second gear 45 in the first differential gear box 41, and the other third gear 56, which is interposed between the first gear 54 and the second gear 55 in the second differential gear box 51, are rotated. Simultaneously, the first and second differential gear box 41 and 51 are rotated by the rotations of the two third gears 46 and 56, so that the first and second output gears 43 and 53, which are provided at the outside of the first and second differential gear boxes 41 and 51, are rotated, respectively. At this time, the first and second output gears 43 and 53 are rotated around the first drive gear 21 and the first steering gear 31 while engaging with the first drive gear 21 and the first steering gear 31, respectively. Therefore, the rotation of the turret 80 is not transmitted to the plurality of wheels 90 or the wheel cases 91.

In the meantime, when the drive motor 2 starts to move the robot base, the first gear 44 of the first differential gear train 40 is rotated. Thus, the third gear 46 which engages with the first gear 44 is rotated to rotate the first differential gear box 41. By the rotation of the first differential gear box 41, the first output gear 43 of the first differential gear train 40 is rotated. Therefore, the first drive gear 21, which engages with the first output gear 43, is rotated. Thereafter, a rotational force of the drive motor 2, transmitted to the first drive gear 21, is transmitted to the plurality of wheels 90 through the second drive gear 22, the plurality of third drive gears 23, the plurality of first bevel gears 24 and the plurality of second bevel gears 25.

To change the direction of the movement of the robot base, the steering motor 3 is operated. By the operation of the steering motor 3, the first gear 54 of the second differential gear train 50 is rotated. Thus, the third gear 56 which engages with the first gear 54 is rotated to rotate the second differential gear box 51. During the rotation of the second differential gear box 51, the second output gear 53 of the second differential gear train 50 is rotated. Therefore, the first steering gear 31, which engages with the second output gear 53, is rotated, so that the second steering gear 32 is rotated to rotate the third steering gear 33, which is provided at the outside of each of the plurality of the wheel cases 91. Thus, the direction of the movement of the robot base is changed by the steering motor 3.

At this time, the steering absolute encoder 60 to detect the attitude of the wheels 90 obtains the information of the rotation of the wheel cases 91 through both the first reduction gear 61 and the first detection gear 62.

In the meantime, in case that the drive motor 2 and turret motor 1, or the steering motor 3 and the turret motor 1 are simultaneously operated, the first or second differential gear train 40 or 50 receives both the rotation of the turret motor 1 through the turret center gear 12 and the first or second input gear 42 or 52 and the rotation of the drive motor 2 or the steering motor 3 through the first gear 44 or 54 of the first or second differential gear train 40 or 50. Thereafter, the first or second differential gear train 40 or 50 subtracts the rotation of the turret motor 1 from the rotation of the drive or steering motor 2 or 3, thus transmitting a subtracted rotation to the plurality of wheels 90. That is, the mobile robot base of the present invention transmits only the rotation of the actuating motor unit comprising the drive motor 2 and the steering motor 3 to the plurality of wheels 90.

As described above, in the synchronous mobile robot base according to the first embodiment of the present invention, the actuating motor unit comprises the drive motor 2 which rotates the plurality of wheels 90 to move the robot base, and the steering motor 3 which controls the plurality of wheel cases 91 to determine the direction of the movement of the robot base. The actuating gear train unit to transmit the rotation from the actuating motor unit to the plurality of wheels 90 comprises the drive gear train 20 and the steering gear train 30. The drive motor 2 is coupled to the drive gear train 20 through the first differential gear train 40. The steering motor 3 is coupled to the steering gear train 30 through the second differential gear train 50. Therefore, the turret 80 and the actuating motor unit or the turret 80 and the actuating gear train unit are decoupled from each other.

The above-mentioned first or second differential gear train 40 or 50 to transmit the rotation of the actuating motor unit placed on the turret 80 to the plurality of wheels 90 regardless of the rotation of the turret 80 may be used in any robot base having a turret mechanism, such as differential mobile robot bases and omnidirectional mobile robot bases, as well as the synchronous mobile robot base according to the first embodiment. A differential mobile robot base according to a second embodiment of the present invention will be described in detail with reference to the accompanying drawing, FIG. 3.

Figure 3:
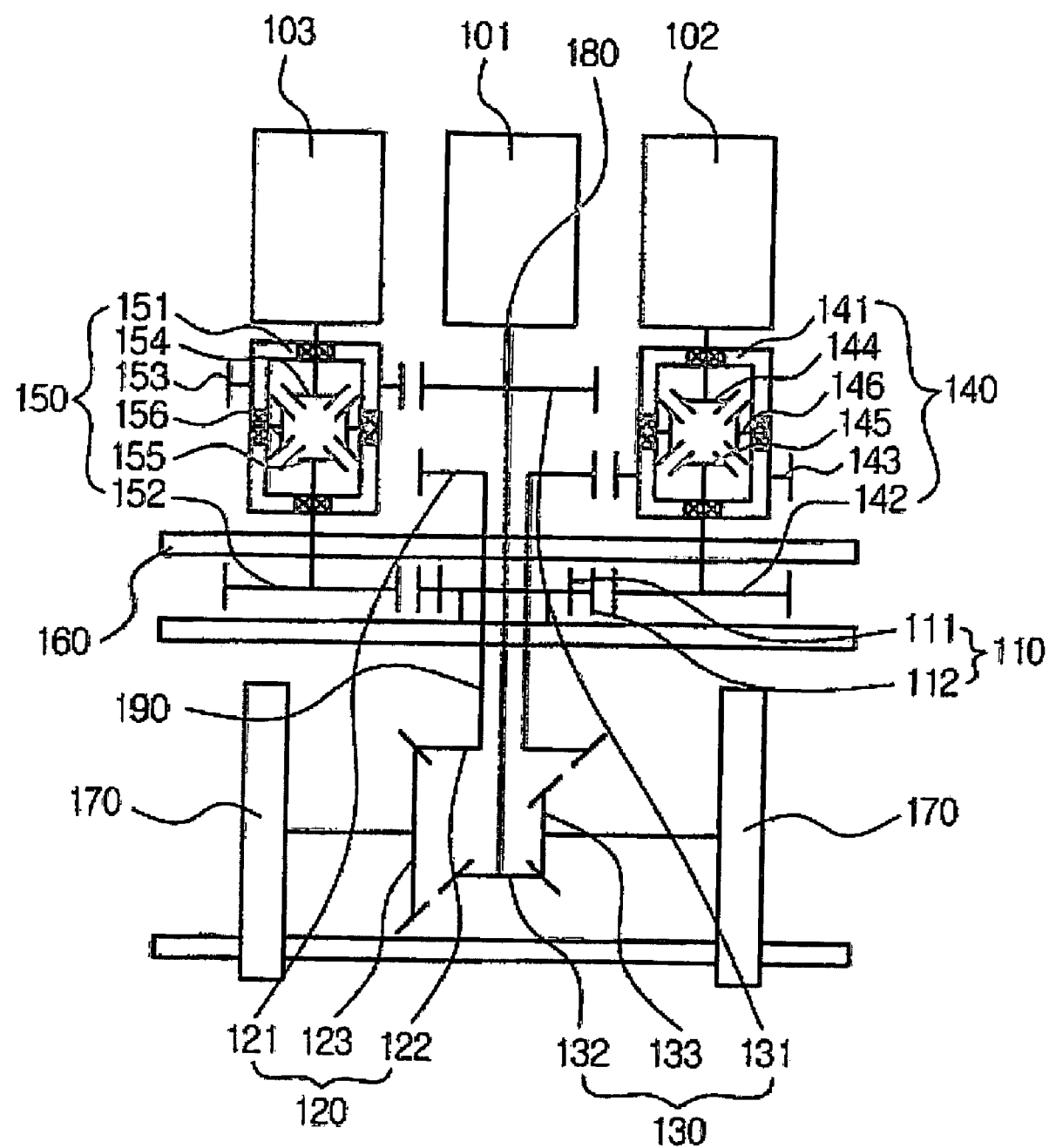
FIG. 3 is a view of a differential mobile robot base with a decoupled turret mechanism, according to a second embodiment of the present invention.
Figure 4:
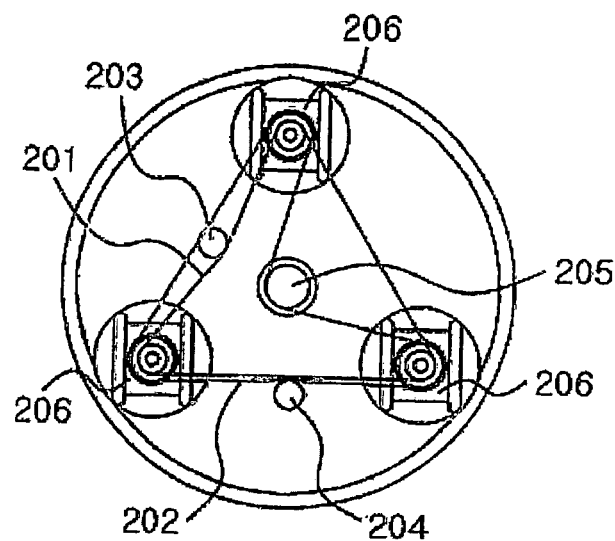
FIG. 4 is a view showing a construction of wheels of a conventional mobile robot base using a belt mechanism.
Figure 5:
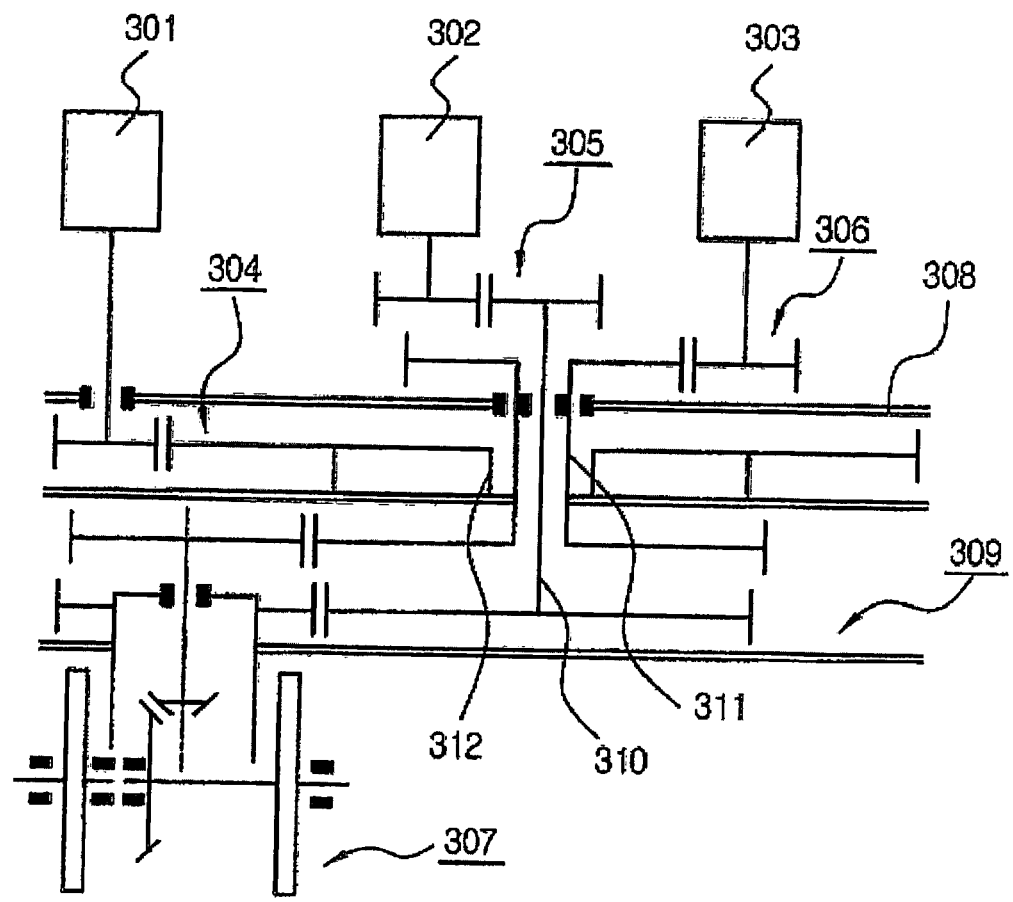
FIG. 5 is a view of another conventional mobile robot base using a gear mechanism.

FIG. 3 is a view of the differential mobile robot base with a decoupled turret mechanism, according to the second embodiment of the present invention. As shown in FIG. 3, the differential mobile robot base according to the second embodiment has a structure in that first and second wheel units 170 and 170' are independently controlled to determine a direction of movement of the robot base according to a difference between rotating speeds of the first and second wheel units 170 and 170'. The mobile robot base according to the second embodiment includes a turret 160 which is rotatably placed on a support frame. The mobile robot base further includes a turret motor 101 and an actuating motor unit which are respectively placed on the turret 160. The actuating motor unit comprises a first drive motor 102 and a second drive motor 103. The mobile robot base further includes the first and second wheel units 170 and 170' which are provided under the support frame to move the robot base. The mobile robot base further includes first and second drive gear trains 120 and 130. The first drive gear train 120 is coupled between the first drive motor 102 and the first wheel unit 170 to transmit a rotation from the first drive motor 102 to the first wheel unit 170. The second drive gear train 120 is coupled between the second drive motor 103 and the second wheel unit 170' to transmit a rotation from the second drive motor 103 to the second wheel unit 170'.

The turret motor 101 rotates the turret 160 around a rotating axis of the turret 160 through a turret gear train 110. The turret gear train 110 comprises a first turret gear 111 and a turret center gear 112 in the same manner as that described for the synchronous mobile robot base according to the first embodiment.

The mobile robot base according to the second embodiment further includes a first differential gear train 140 which is coupled between the first drive motor 102 and the first drive gear train 120. Thus, the first drive motor 102 is connected to the first wheel unit 170 through both the first differential gear train 140 and the first drive gear train 120 to rotate the first wheel unit 170. The first differential gear train 140 includes a first input gear 142 to engage with the turret center gear 112, and a first differential gear box 141. The first differential gear box 141 has a first gear 144 which is coupled to the first drive motor 102, a second gear 145 which is coupled to the first input gear 142, and a third gear 146 which is interposed between the first and second gears 144 and 145. The first differential gear train 140 further includes a first output gear 143 which is provided at an outside of the first differential gear box 141 to be coupled to the first drive gear train 120.

The first drive gear train 120 has a first drive gear 121 which is provided on an upper end of a first rotating shaft 180 to engage with the first output gear 143 of the first differential gear train 140. The first drive gear train 120 further has a first bevel gear 122 which is provided on a lower end of the first rotating shaft 180 to be rotated on the first rotating shaft 180 along with the first drive gear 121, and a second bevel gear 123 which engages with the first bevel gear 122 to rotate the first wheel unit 170.

The mobile robot base according to the second embodiment further includes a second differential gear train 150 which is coupled between the second drive motor 103 and the second drive gear train 130. Therefore, the second drive motor 103 is connected to the second wheel unit 170' through the second differential gear train 150 and the second drive gear train 130 to rotate the second wheel unit 170'. The second differential gear train 150 includes a second input gear 152 to engage with the turret center gear 112, and a second differential gear box 151. The second differential gear box 151 has a first gear 154 which is coupled to the second drive motor 103, a second gear 155 which is coupled to the second input gear 152, and a third gear 156 which is interposed between the first and second gears 154 and 155. The second differential gear train 150 further includes a second output gear 153 which is provided at an outside of the second differential gear box 151 to be coupled to the second drive gear train 130.

The second drive gear train 130 has a second drive gear 131 which is provided on an upper end of a second rotating shaft 190 to engage with the second output gear 153 of the second differential gear train 150. The second drive gear train 130 further has a third bevel gear 132 which is provided on a lower end of the second rotating shaft 190 to be rotated on the second rotating shaft 190 along with the second drive gear 131, and a fourth bevel gear 133 which engages with the second bevel gear 132 to rotate the second wheel unit 170'.

At this time, the first and second rotating shafts 180 and 190 and the turret center gear 112 are arranged to form a triple shaft mechanism in the same manner as that described for the synchronous mobile robot base according to the first embodiment. Thus, the rotational forces of the first and second motors 102 and 103 are respectively transmitted to the first and second wheel units 170 and 170' through the triple shaft mechanism, and, simultaneously, the triple shaft mechanism allows the turret 160 to endlessly rotate.

In the meantime, the first and second wheel units 170 and 170' of the second embodiment are independently rotated by the first and second drive motors 102 and 103, respectively, different from the first embodiment. However, the operation of the first and second differential gear trains 140 and 150 to decouple the turret 160, the first and second drive gear trains 120 and 130 and the first and second drive motors 102 and 103 remains the same as the first embodiment, and further explanation is thus not deemed necessary.

As described above, the mobile robot base of the present invention includes the turret 80, 160, the plurality of motors 1, 2 and 3, 101, 102 and 103, the triple shaft mechanism, and the actuating gear train unit. Therefore, the rotational forces of the plurality of motors 1, 2 and 3, 101, 102 and 103 are transmitted to the plurality of wheels 90, 170 and 170' through the triple shaft mechanism and the actuating gear train unit, and, simultaneously, endlessly rotates the turret 80, 160. Furthermore, in the mobile robot base of the present invention with the differential gear train unit, only the actuating force of the actuating motor unit is transmitted to the plurality of wheels 90, 170 and 170' while the turret 80, 160 and the actuating gear train unit are decoupled. Therefore, the mobile robot base of the present invention is applied to any robot bases with turrets, such as synchronous mobile robot bases, differential mobile robot bases and omnidirectional robot bases.

INDUSTRIAL APPLICABILITY

As described above, the present invention provides a mobile robot base with a decoupled turret mechanism, which has a structure possible to transmit only a rotation of an actuating motor unit to a plurality of wheels through a differential gear train unit, regardless of a rotation of a turret, so that a control algorithm of the actuating motor is simplified. Accordingly, the actuating motor unit is precisely controlled. Furthermore, because the actuating motor unit is independently operated regardless of the rotation of the turret, the mobile robot base of the present invention reduces power consumption.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A mobile robot base with a decoupled turret mechanism, comprising:
   a turret rotatably placed on a support frame;
   a turret motor provided on the turret;
   an actuating motor unit provided on the turret to actuate a plurality of wheels;
   an actuating gear train unit coupled between the actuating motor unit and the plurality of wheels to transmit an actuating force generated from the actuating motor unit to a lower portion of the turret through a triple shaft mechanism;

a turret gear train coupled between the turret and the turret motor, and comprising a first turret gear and a turret center gear, so that the turret motor rotates the turret on the support frame through the turret gear train; and a differential gear train unit coupled to both the turret gear train and the actuating motor unit to receive rotations of both the turret and the actuating motor unit, so that the differential gear train unit subtracts the rotation of the turret from the rotation of the actuating motor unit, thus transmitting a subtracted rotation to the plurality of wheels, and thus, only the rotation of the actuating motor unit is transmitted to the plurality of wheels.

2. The robot base according to claim 1, wherein the differential gear train unit comprises:

an input gear to engage with the turret center gear of the turret gear train;

a differential gear box comprising:
  a first gear coupled to the actuating motor unit;
  a second gear coupled to the input gear; and
  a third gear interposed between the first and second gears; and an output gear provided at an outside of the differential gear box to be coupled to the actuating gear train unit.

3. The robot base according to claim 2, wherein a gear ratio between the output gear of the differential gear train unit and a predetermined gear of the actuating gear train unit, which engages with the output gear, is ½ times a gear ratio between the turret center gear and the input gear of the different gear train unit.

4. The robot base according to claim 1, wherein the actuating motor unit comprises:

a drive motor to rotate the plurality of wheels; and a steering motor to control a plurality of wheel cases which hold the plurality of wheels, so that a direction of movement of the robot base is determined by an operation of the steering motor, and the actuating gear train unit comprises:

a drive gear train comprising first, second and third drive gears and first and second bevel gears to transmit a rotational force generated from the drive motor to the plurality of wheels; and a steering gear train comprising first, second and third steering gears to transmit a rotational force generated from the steering motor to the plurality of wheel cases, and the differential gear train unit comprises:

a first differential gear train coupled to both the turret center gear and the drive motor to receive the rotations of both the turret and the drive motor, so that the first differential gear train subtracts the rotation of the turret from the rotation of the drive motor, thus transmitting a subtracted rotation to the drive gear train; and a second differential gear train coupled to both the turret center gear and the steering motor to receive the rotations of both the turret and the steering motor, so that the second differential gear train subtracts the rotation of the turret from the rotation of the steering motor, thus transmitting a subtracted rotation to the steering gear train.

5. The robot base according to claim 4, further comprising:

a steering absolute encoder, comprising:
  a first detection gear provided on an output shaft of the steering motor to detect attitudes of the wheel cases; and
  a first reduction gear to engage with the first detection gear; and a turret absolute encoder, comprising:
  a second detection gear provided on an output shaft of the turret motor to detect attitudes of the turret; and
  a second reduction gear to engage with the second detection gear.

6. The robot base according to claim 5, wherein a reduction ratio of the steering gear train is set such that a rotation angle of the first reduction gear of the steering absolute encoder is equal to a rotation angle of each of the wheel cases holding the wheels, and a reduction ratio of the turret gear train is set such that a rotation angle of the second reduction gear of the turret absolute encoder is equal to a rotation angle of the turret.

7. The robot base according to claim 1, wherein the actuating motor unit comprises:

first and second drive motors to respectively drive two wheel units, independently, and the actuating gear train unit comprises:

a first drive gear train comprising a first drive gear, first and second bevel gears to transmit a rotational force generated from the first drive motor to one of the two wheel units; and a second drive gear train comprising a second drive gear, third and fourth bevel gears to transmit a rotational force generated from the second drive motor to remaining one of the two wheel units, and the differential gear train unit comprises:

a first differential gear train coupled to both the turret center gear of the turret gear train and the first drive motor to receive rotations of both the turret and the first drive motor, so that the first differential gear train subtracts the rotation of the turret from the rotation of the first drive motor, thus transmitting a subtracted rotation to the first drive gear train; and a second differential gear train coupled to both the turret center gear and the second drive motor to receive rotations of both the turret and the second drive motor, so that the second differential gear train subtracts the rotation of the turret from the rotation of the second drive motor, thus transmitting a subtracted rotation to the second drive gear train.

* * * * *